United States Patent
Sun et al.

(10) Patent No.: US 8,430,680 B2
(45) Date of Patent: Apr. 30, 2013

(54) CONNECTOR WITH A DUSTPROOF COVER

(75) Inventors: Zheng-Guo Sun, Kunshan (CN);
Jia-Yong He, Kunshan (CN);
Zhong-Hua Yao, Kunshan (CN);
Qi-Sheng Zheng, Kunshan (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 256 days.

(21) Appl. No.: 13/015,240

(22) Filed: Jan. 27, 2011

(65) Prior Publication Data

US 2011/0188818 A1 Aug. 4, 2011

(30) Foreign Application Priority Data

Jan. 30, 2010 (CN) .......................... 2010 2 0302022

(51) Int. Cl.
*H01R 27/00* (2006.01)
(52) U.S. Cl.
USPC .......................................................... 439/217
(58) Field of Classification Search .................. 439/217, 439/519, 136
See application file for complete search history.

(56) References Cited

U.S. PATENT DOCUMENTS

| | | | |
|---|---|---|---|
| 7,544,073 B2 * | 6/2009 | Nguyen et al. | 439/135 |
| 7,699,630 B2 * | 4/2010 | Kim | 439/136 |
| 7,972,150 B1 * | 7/2011 | Lin | 439/88 |
| 8,033,739 B2 * | 10/2011 | Wang et al. | 385/53 |
| 2002/0119697 A1 | 8/2002 | Chan | |
| 2009/0123117 A1 * | 5/2009 | Wang et al. | 385/92 |
| 2010/0273338 A1 * | 10/2010 | Shu et al. | 439/138 |

* cited by examiner

*Primary Examiner* — Chandrika Prasad
(74) *Attorney, Agent, or Firm* — Wei Te Chung; Ming Chieh Chang

(57) ABSTRACT

A connector includes a connector body, a cover movably attached to the connector body, and a limiting mechanism retaining the cover to the connector body. The connector has a mating port for receiving a mating connector, a tongue with a number of contacts exposed to the mating port, and an optical module forwardly exposed to a rear side of the mating port. The cover has a base to cover a front end of the mating port, and an insertion portion extending into the mating port to cover the contacts along an up to down direction and the optical module along a front to back direction. The limiting mechanism can prevent the cover from detaching from the connector body when the cover is pulled out of the mating port.

15 Claims, 10 Drawing Sheets

CONNECTOR WITH A DUSTPROOF COVER

BACKGROUND OF THE INVENTION

1. Field of the Invention

The present invention relates to a connector, and more particularly to a connector incorporated with a dustproof cover which is movably attached thereto.

2. Description of Related Art

Connectors are widely used in variety electronic devices to connect the electronic devices with each other for transmitting signals therebetween. Of course, some connectors are spare for electrically connecting some temporary devices. The spare connector has a mating port opening outwardly when it is not used and a plurality of contacts exposed to the mating port. Then dust in the air will enter into the mating port, and sulfur dioxide in the air will corrode the contacts, which results that the plating on the contacts would be destroyed and impedance of the contacts would be increased, which affects stability of the signal transmission.

For solving above problem, some connector manufacturers design a dustproof cover which can be assembled to the mating port of the spare connector for preventing the dust or sulfur dioxide in the air from entering into the mating port, and be taken off to expose the mating port for connecting with another electronic device. However, the separated cover is easily lost or confused in different connectors, that is inconvenient to consumers.

Hence, an improved connector is desired to overcome the above problems.

BRIEF SUMMARY OF THE INVENTION

According to the present invention, a connector, comprises: a connector body having a mating port for receiving a mating connector, a tongue with a plurality of contacts exposed to the mating port, and an optical module forwardly exposed to a rear side of the mating port; a cover movably attached to the connector body, the cover having a base to cover a front end of the mating port, and an insertion portion extending into the mating port to cover the contacts along an up to down direction and the optical module along a front to back direction; and a limiting mechanism retaining the cover to the connector body to prevent the cover from detaching from the connector body when the cover is pulled out of the mating port.

According to another aspect of the present invention, a connector, comprises: an metallic shell defining a mating port with an opening, and an extension portion extending from an edge of the shell; a housing with a plurality of contacts protruding into the mating port; and a dustproof cover secured to the opening and within a link movably attached to the extension portion of the shell.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

Figure 1:
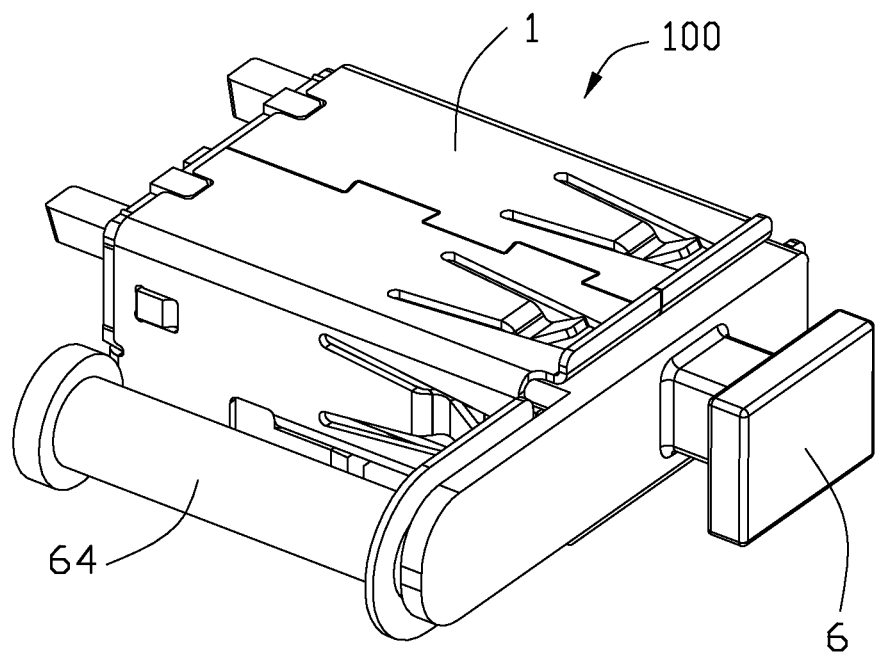
FIG. 1 is a perspective view of a connector according to a first embodiment of the present invention, showing a mating port of the connector is covered by a dustproof cover thereof.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Referring to FIGS. 1-4, a connector 100 according to a first embodiment of the present invention is disclosed. The connector 100 is an optical and electrical connector which is essentially an I/O (Input/Output) connector located behind a panel (not shown) of a computer case which defines an insertion opening therein in alignment with the connector, and comprises a connector body 1, a dustproof cover 6 movably retained on the connector body 1 and a limiting mechanism linking the cover 6 and the connector body 1 together to prevent the cover 6 from detaching from the connector body 1. The connector body 1 has a housing 2, a plurality of contacts 3 and an optical module 4 retained on the housing 2, and a shell 5 shielding the housing 2.

Figure 2:
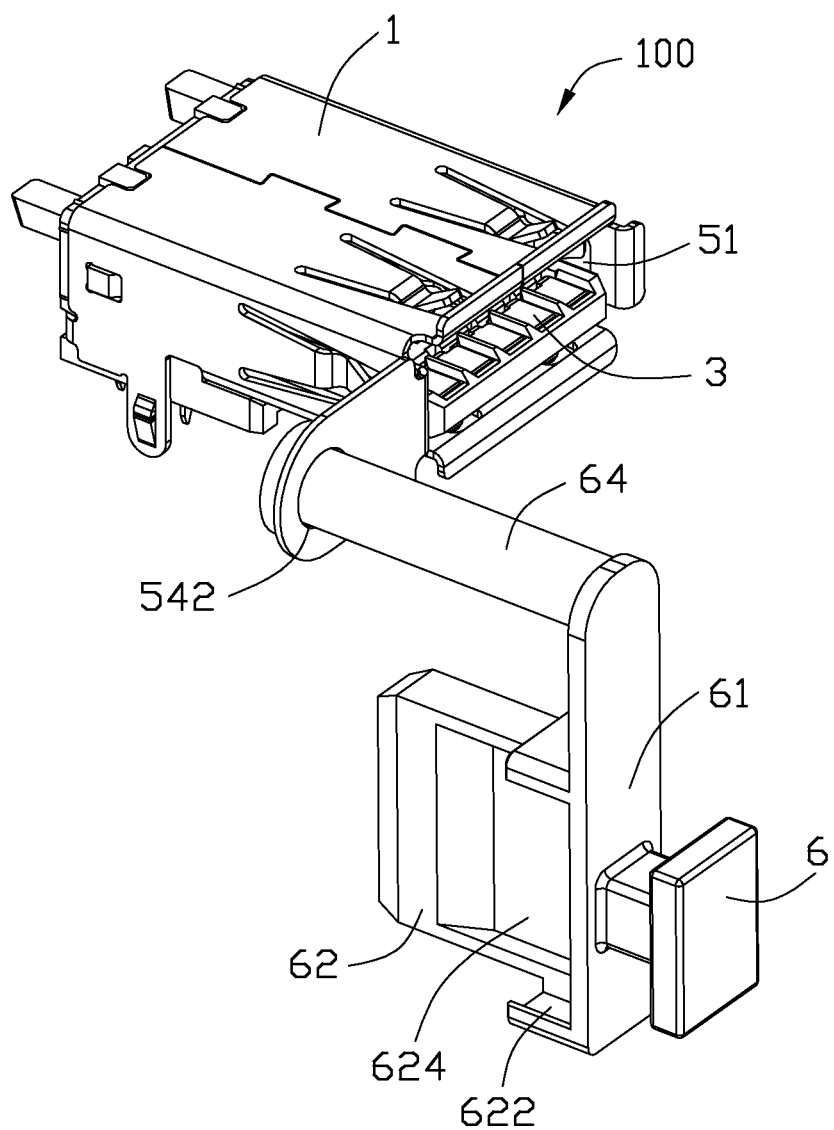
FIG. 2 is a perspective view of the connector shown in FIG. 1, showing the cover is pulled out of the mating port.
Figure 3:
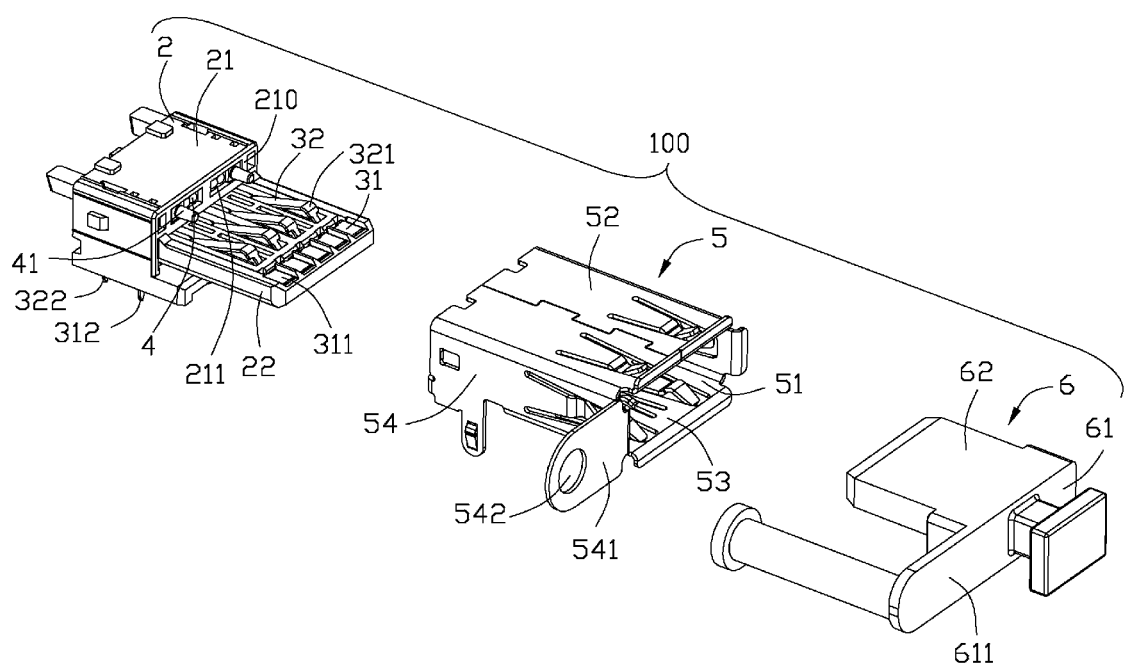
FIG. 3 is a partly exploded view of the connector shown in FIG. 1.

Referring to FIGS. 2-3, the housing 2 has a body portion 21 and a tongue 22 forwardly extending from a front end surface 210 of the body portion 21. The body portion 21 has a receiving space 211 extending therethrough along a front to back direction to receive the optical module 4. The optical module 4 has a pair of posts 41 forwardly protruding beyond the front end surface 210 to engage with a mating plug (not shown). The post 41 spaces apart from the tongue 22 along an up to down direction, and is located at an upper side of the tongue 22. The post 41 defines a length which is shorter than that of the tongue 22.

The contacts 3 comprise a plurality of flat contacts 31 and a plurality of resilient contacts 32. Each flat contact 31 has a flat contact portion 311 forwardly extending to a front end of the tongue 22 and a first soldering portion 312 downwardly extending out of the housing 2. Each resilient contact 32 has a resilient contact portion 321 forwardly extending to the tongue 22 and a second soldering portion 322 downwardly extending out of the housing 2. The resilient contact portions 321 upwardly protrude beyond a top surface of the tongue 22, and are located behind the flat contact portions 311 along the front to back direction. The contact portions 311, 321 are located at a same side of the tongue 22 along the up to down direction. An arrangement of the contact portions 311, 321 on the tongue 22 is compatible to USB 3.0 proposal, the contact portions 311, 321 are used to mate with a standard USB 3.0 plug for transmitting USB 3.0 signals.

The shell 5 encloses the tongue 22. The connector body 1 defines a mating port 51 between the shell 5 and the tongue 22 to receive the mating plug. The mating port 51 defines an opening at a front end thereof. The optical module 4 is located at a rear side of the mating port 51. The shell 5 has a top wall 52, a bottom wall 53 and a pair of side walls 54 connecting the top wall 52 and the bottom wall 53. The shell 5 further has an extension portion 541 outwardly extending from a front end of one side wall 54. The extension portion 541 defines a position hole 542 extending therethrough along the front to back direction.

Figure 4:
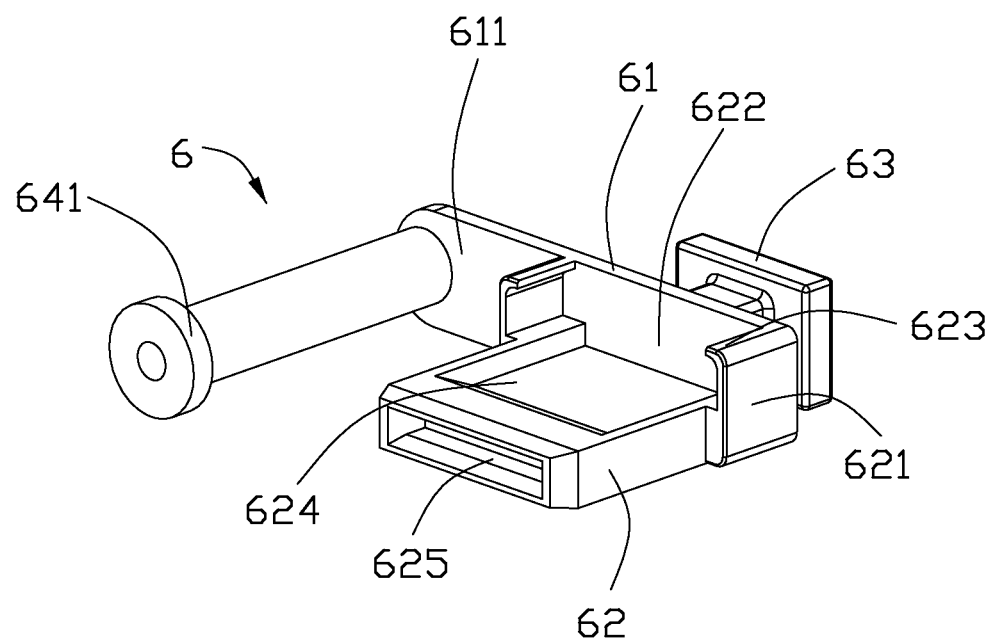
FIG. 4 is a perspective view of the cover shown in FIG. 2.

Referring to FIG. 4, the dustproof cover 6 is made of insulative material, and has a base 61 for covering the opening of the mating port 51, an insertion portion 62 extending from the base 61 along an insertion direction of the mating plug, and an operating portion 63 extending from the base 61 along a direction opposite to the insertion direction. The front to back direction is the insertion direction of the mating plug in the present invention. The base 61 has a dimension which is same to that of a front end of the mating port 51. The insertion portion 62 extends from a top end of the base 61, and has a top surface which is coplanar with a top end of the base 61.

Referring to FIGS. 2 and 4, the limiting mechanism in the first embodiment is a pole 64 located at one side of the insertion portion 62 along a transverse direction of the housing 2, and extending along the front to back direction. The cover 6 further has a connecting portion 611 laterally extending from the base 61. The connecting portion 611 corresponds to the extension portion 541. The connecting portion 611 and the base 61 are located at a common plane. The pole 64 unitarily extends from the base 61 along the insertion direction. The base 61 covers a front end of the mating port 51 to seal the mating port 51 and prevent dust or other thing (not shown) from entering therein. The insertion portion 62 extends into the mating port 51 to cover the contact portions 311, 321 along the up to down direction for prevent sulfur dioxide from corroding the contacts 3.

The cover 6 further has a pair of side walls 621 downwardly extending from two sides of the insertion portion 62. The side walls 621 and the insertion portion 62 defines a cavity 622 therebetween to receive the tongue 22. Each side wall 621 is formed with a hook 623 inwardly extending from a lower end thereof to lock with a lower side of the tongue 22 for preventing the cover 6 from moving along the up to down direction or being easily pulled out of the mating port 51. The insertion portion 62 defines a recess 624 recessed from a lower side thereof and close to the base 61. The resilient contact portions 321 are received in the recess 624 when the insertion portion 62 is inserted into the mating port 51, which can prevent the resilient contact portions 321 from being pressed by the insertion portion 62 for a long time, then the resilient contact portions 321 can remain good resilience to contact with the mating plug. The recess 624 communicates with the cavity 622 along the up to down direction. The insertion portion 62 further defines a slot 625 recessed from a rear end surface thereof for receiving the posts 41 and covering a front end of the optical module 4. The slot 625 defines a length which is longer than that of the post 41 and shorter than that of the tongue 22.

The pole 64 defines a diameter which is smaller than that of the position hole 542, then the pole 64 can be received in the position hole 542, and can move in the position hole 542 along the front to back direction or rotate in the position hole 542. At the same time, the cover 6 can be driven to move along the front to back direction or rotate around the pole 64 when the insertion portion 62 is pulled out of the mating port 51.

The pole 64 is formed with a resisting portion 641 at a free end thereof to resist a rear side of the extension portion 541 for preventing the cover 6 from being detached from the connector body 1 and lost. The resisting portion 641 is formed by melting the free end of the pole 64 after the pole 64 passes through the position hole 542. The resisting portion 641 defines a diameter which is larger than an inner diameter of the position hole 542. The insertion portion 62 defines a length which is approximately same to that of the tongue 22 for making the tongue 22 be fully covered by the insertion portion 62, which can further prevent dust or other things from entering into the mating port 51 to destroy the contacts 3 and the optical module 4. The pole 64 defines a length between an inner side of the connecting portion 611 and the resisting portion 641, and the length is longer than that of the insertion portion 62 along the front to back direction, so that the insertion portion 62 can be fully pulled out of the mating port 51 to expose the mating port 51.

When the connector body 1 is not used, firstly, a consumer (not shown) can operate the operating portion 63 to make the insertion portion 62 rotate to be parallel to the tongue 22; secondly, pushing the insertion portion 62 into the mating port 51, referring to FIG. 1, at this time, the insertion portion 62 covers the contact portions 311, 321 along the up to down direction, and covers the optical module 4 along the front to back direction, and the base 61 covers a front end of the mating port 51 to prevent the dust or other thing from entering into the mating port to destroy the contacts 3 and the optical module 4.

When the connector body 1 is to be used, firstly, pulling the operating portion 63 outwardly to make the insertion portion 62 move out of the mating port 51, at this time, the resisting portion 641 resist a rear side of the extension portion 541 to remain the cover 6 on the connector body 1; then releasing the cover 6 to expose the mating port 51, and the mating plug can be inserted into the mating port 51, referring to FIG. 2, and the cover 6 can not be lost when the connector body 1 is used.

Figure 5:
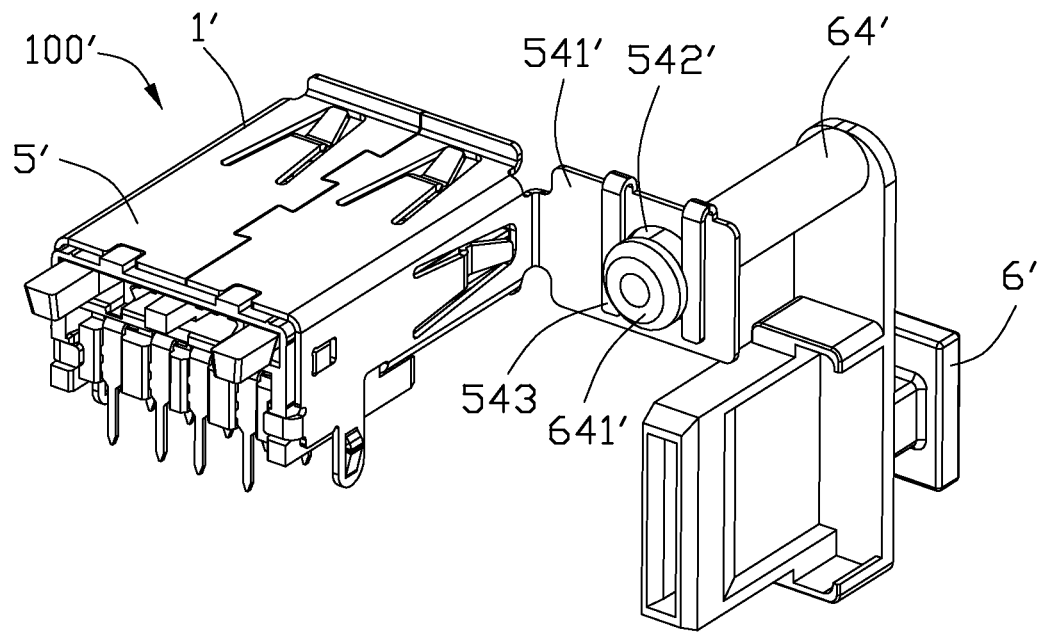
FIG. 5 is a perspective view of a connector according to a second embodiment of the present invention, showing a cover thereof is pulled out of a mating port of the connector thereof.
Figure 6:
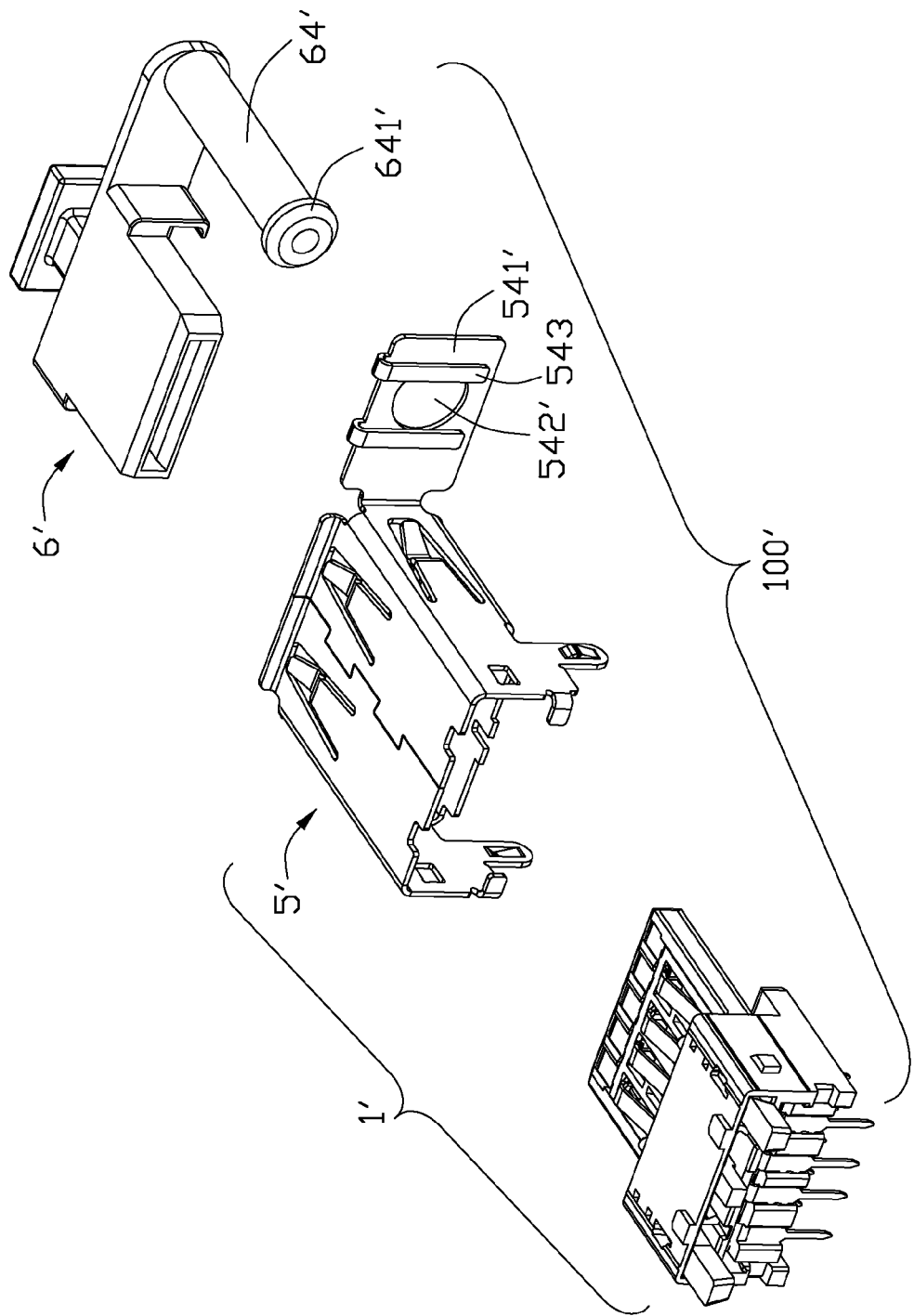
FIG. 6 is a partly exploded view of the connector shown in FIG. 5.

Referring to FIGS. 5 and 6, a connector 100' according to a second embodiment of the present invention is disclosed. The connector 100' also comprises a connector body 1' and a dustproof cover 6' movably retained on the connector body F. The connector bodies 1, 1' in the first and second embodiments are similar, and a small difference therebetween is that a resisting portion 641' on a pole 64' of the cover 6' in the second embodiment is formed before the pole 64' is assembled to the connector body 1'; and the resisting portion 641' defines a diameter which is smaller than that of a position hole 542' of a shell 5' in the second embodiment; besides, the shell 5' of the connector 1' has a pair of resisting tabs 543 downwardly extending from a top edge of an extension portion 541', and the resisting tabs 543 are located at two sides of the position hole 542' and define a distance therebetween which is smaller than the diameter of the resisting portion 641', and the resisting tabs 543 are downwardly bent after the resisting portion 641' passing through the position hole 542, then the resisting portion 641' can resist a rear side of the resisting tabs 543 to prevent the cover 6' from detaching from the connector body 1'.

Figure 7:
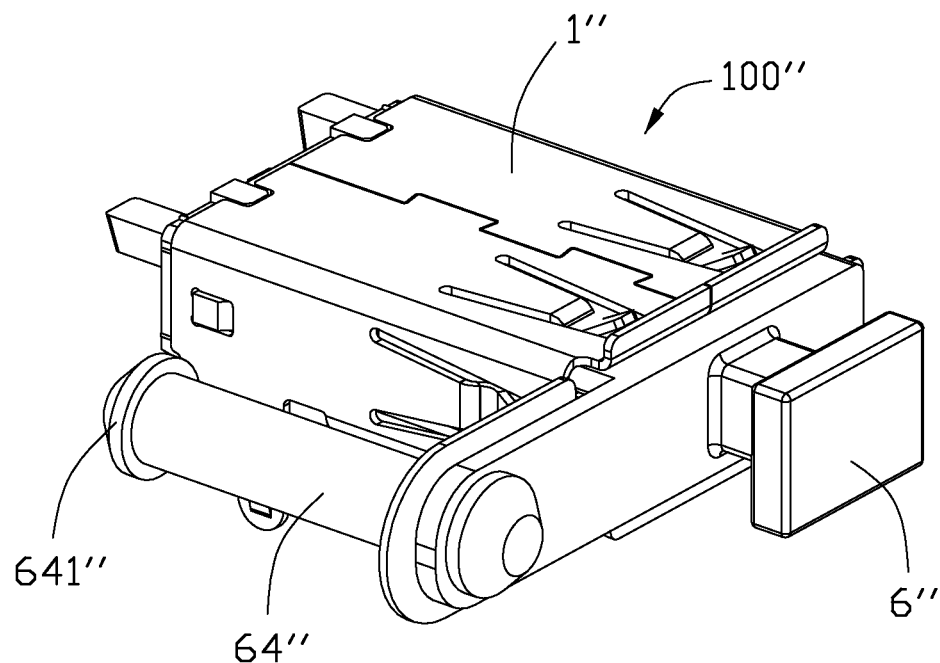
FIG. 7 is a perspective view of a connector according to a third embodiment of the present invention, showing a mating port of the connector is closed by a cover thereof.
Figure 8:
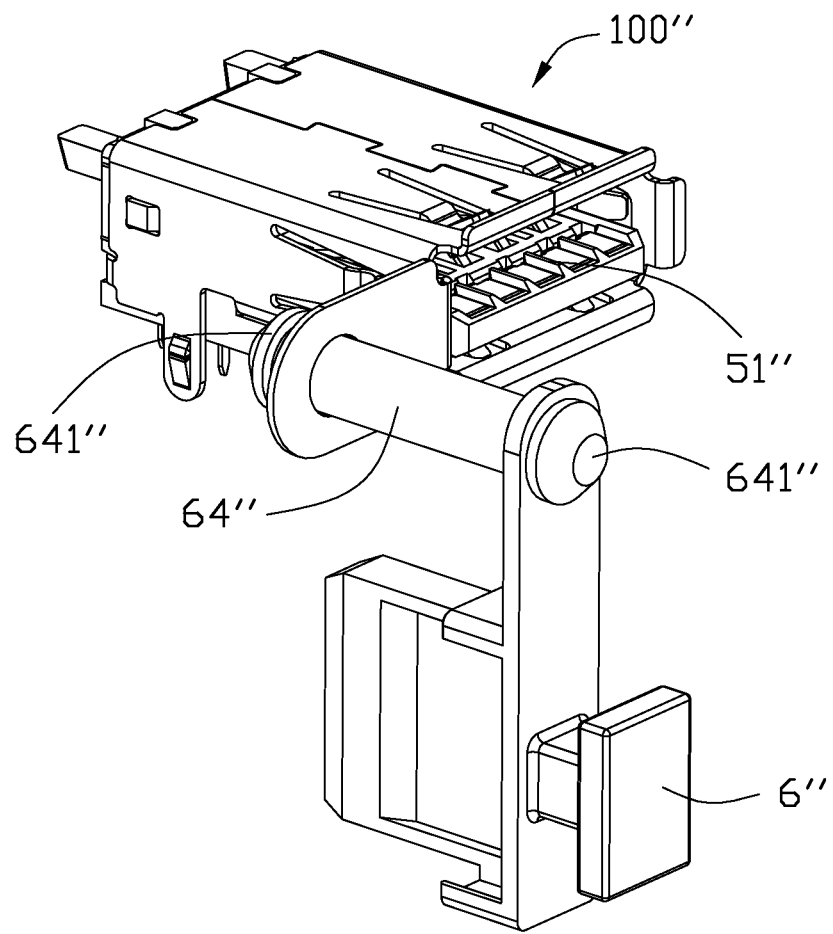
FIG. 8 is a perspective view of the connector shown in FIG. 7, showing the cover is pulled out of the mating port.
Figure 9:
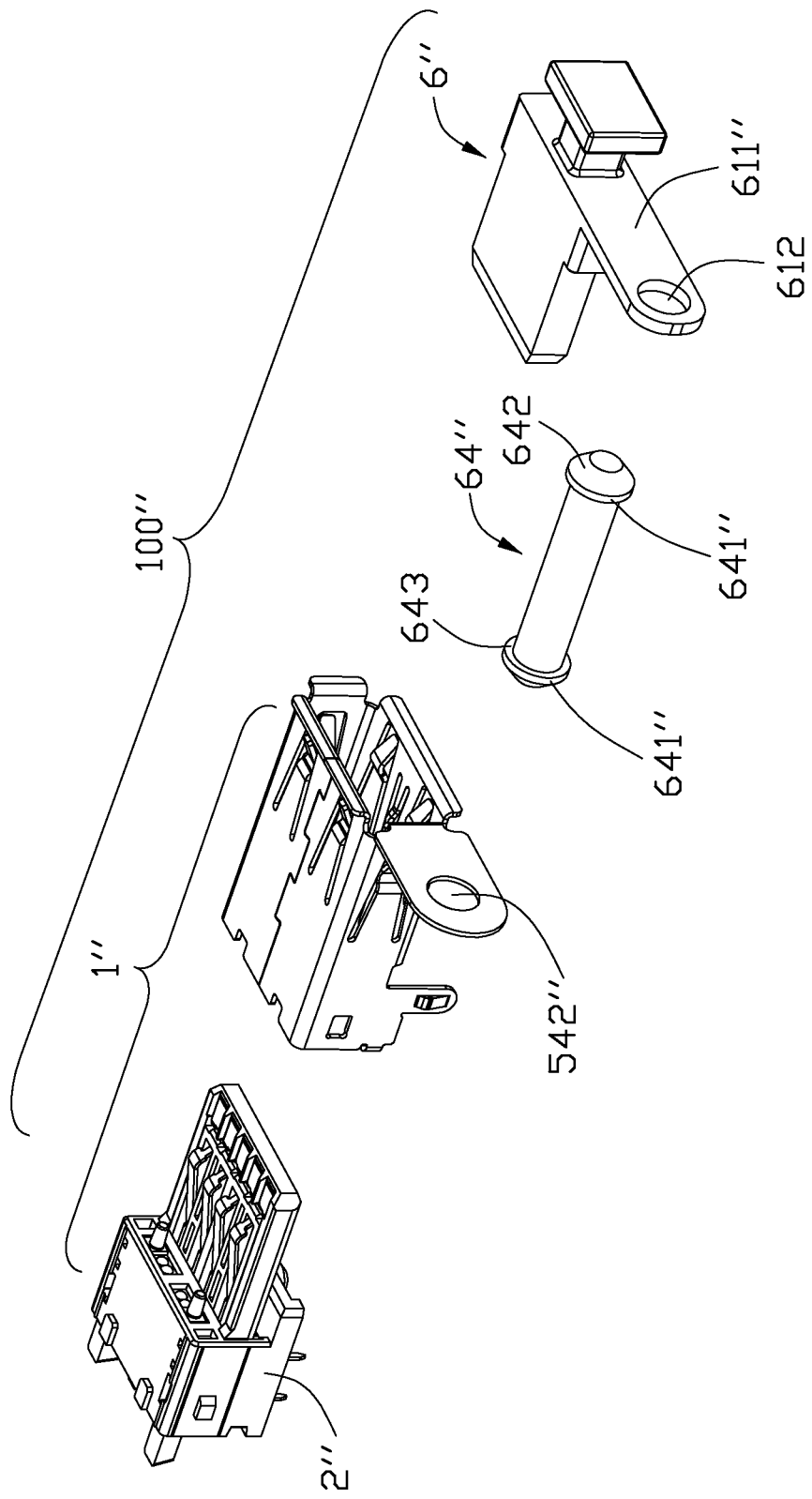
FIG. 9 is a partly exploded view of the connector shown in FIG. 8.

Referring to FIGS. 7-9, a connector 100" according to a third embodiment of the present invention is disclosed. The connector 100" comprises a connector body 1", a dustproof cover 6" and a limiting mechanism separately from the dustproof cover 6". The connector body 1" is same to that in the first embodiment. The limiting mechanism also is a pole 64" extending along the front to back direction. The dustproof cover 6" and the limiting mechanism 64" are separately formed. The cover 6" defines a retaining hole 612 corresponding to a position hole 542" of the connector body 1". The pole 64" has two resisting portions 641" at two ends thereof to engage with the position hole 542" and the retaining hole 612 respectively. The pole 64" is made of rubber material with good plastic deformation for being assembled conveniently.

The resisting portion 641" is formed with an oblique guiding surface 642 at an outer side thereof and a resisting surface 643 at an inner side thereof. The guiding surface 642 guides the resisting portion 641" to be assembled to the connector body 1" and the dustproof cover 6". The resisting surface 643 defines a diameter which is larger than that of the retaining hole 612 and the position hole 542" to prevent the dustproof cover 6" from detaching from the connector body 1". A middle position between the resisting portions 641" of the pole 64" defines a diameter which is smaller than that of the retaining hole 612 and the position hole 542" to make the dustproof cover 6" be movably retained on the connector body 1".

Figure 10:
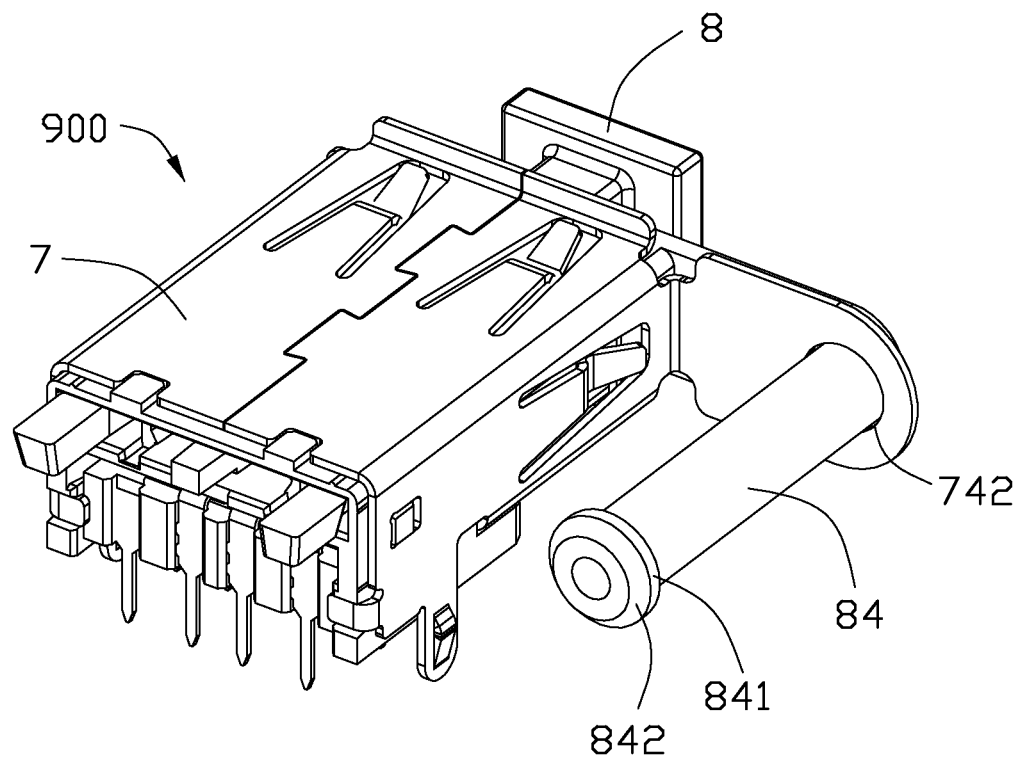
FIG. 10 is a perspective view of a connector according to a fourth embodiment of the present invention, showing a mating port of the connector is covered by a cover thereof

Referring to FIG. 10, a connector 900 according to a fourth embodiment of the present invention is disclosed. The connectors 900, 100 in the fourth and first embodiments are similar, and a small difference therebetween is that a dustproof cover 8 of the connector 900 is made of rubber material with good plastic deformation. Besides, a pole 84 on the dustproof cover 8 is formed with a guiding surface 842 at an outer side thereof to guide the pole 84 passing through a position hole 742 of a connector body 7.

As fully described above, the connector 100, 100', 100", 900 in the present invention is formed with the limiting mechanism 64, 64', 64", 84 to movably link the dustproof cover 6, 6', 6", 8 to the connector body 1, 1', 1", 7, which can prevent the cover 6, 6', 6", 8 from detaching from the connector body 1, 1', 1", 7, then the cover 6, 6', 6", 8 can not be lost and confused with other covers (not shown) used on other connectors (not shown). Besides, the limiting mechanism is said pole 64, 64', 64", 84 which extends along the front to back direction and can drive the cover 6, 6', 6", 8 moving outwardly to detached from the mating port 51 or inwardly to seal the mating port 51 for preventing the dust and other things from entering into the mating port 51. In addition, the limiting mechanism 64, 64', 64", 84 can rotate to drive the cover 6, 6', 6", 8 to release the mating port 51. On the other hand, alternately the dustproof may be attached to the panel, behind which the connector is located, so the connector may keep the original size without the extension portion 541.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A connector, comprising:
   a connector body having a mating port for receiving a mating connector, a tongue with a plurality of contacts exposed to the mating port, and an optical module forwardly exposed to a rear side of the mating port;
   a cover movably attached to the connector body, the cover having a base to cover a front end of the mating port, and an insertion portion extending into the mating port to cover the contacts along an up to down direction and the optical module along a front to back direction; and
   a limiting mechanism retaining the cover to the connector body to prevent the cover from detaching from the connector body when the cover is pulled out of the mating port.

2. The connector according to claim 1, wherein the connector body defines a position hole extending along the front to back direction, and the limiting mechanism is a pole extending along the front to back direction to engage with the position hole so that the cover can move along the front to back direction and rotate around the limiting mechanism.

3. The connector according to claim 2, wherein the connector body has a housing and a shell shielding the housing, the shell has an extension portion outwardly extending from a front end thereof, and said position hole is defined on and passes through the extension portion, the limiting mechanism has a resisting portion to resist a rear side of the extension portion.

4. The connector according to claim 3, wherein the housing has a body portion, said tongue extends from a front end surface of the body portion, and the optical module has at least a post forwardly extending beyond the front end surface of the body portion, the cover defines a slot recessed from a rear end of the insertion portion to receive the post, and the slot defines a length which is longer than that of the post and shorter than that of the tongue.

5. The connector according to claim 4, wherein the cover has a pair of side walls downwardly extending from two sides of the insertion portion, and the side walls and the insertion portion form a cavity therebetween to receive the tongue.

6. The connector according to claim 5, wherein each side wall has a hook to position the tongue in the cavity.

7. The connector according to claim 4, wherein the contacts have a plurality of resilient contacts with resilient contact portions protruding beyond a top surface of the tongue, and the insertion portion defines a recess at a lower side thereof to receive the resilient contact portions.

8. The connector according to claim 3, wherein the cover has a connecting portion outwardly extending from the base, and the limiting mechanism unitarily extends from the connecting portion.

9. The connector according to claim 3, wherein the cover has a connecting portion outwardly extending from the base, the connecting portion defines a retaining hole extending therethrough along the front to back direction, and two ends of the limiting mechanism extend through the position hole and the retaining hole respectively to movably link the cover and the connector body together.

10. The connector according to claim 3, wherein the limiting mechanism defines a length which is longer than that of the insertion portion to make the insertion portion can be conveniently detached from the mating port.

11. The connector according to claim 1, wherein the cover further has an operating portion extending from the base along a direction opposite to the direction along which the insertion portion extends.

12. An electrical connector assembly comprising:

an I/O (Input/Output) panel for use within a computer, defining an insertion opening communicating with an exterior in a mating direction;

an electrical connector located behind the panel and essentially aligned with the insertion opening in said mating direction, said connector including:

an insulative housing enclosed in a metallic shell to commonly define a mating port with a mating opening in front of the mating port while behind the insertion opening;

a plurality of contacts disposed in the housing with contacting sections exposed in the mating port; and a discrete dustcover attached to one of the connector and the panel, and defining a base portion essentially covering the mating opening, and an insertion portion extending from the base portion into the mating port with a distance in the mating direction; wherein the dustcover further includes a limiting mechanism which not only allows the dustcover to be attached to said one of the connector and the panel with limited movement restriction but also allows the insertion portion to be completely withdrawn from the mating port for exposing the mating port.

13. The electrical connector assembly as claimed in claim 12, wherein said connector is equipped with an optical device essentially located behind the mating port, and a front end of said extension portion closely covers said optical device in said mating direction.

14. The electrical connector assembly as claimed in claim 12, wherein said limiting mechanism is attached to the connector.

15. The electrical connector assembly as claimed in claim 12, wherein said limiting mechanism includes a pole extending in the mating direction so as to allow, during withdrawal of the dustcover from the mating port, said dustcover to evenly move relative to the panel in said mating direction without tilting.

* * * * *